(12) United States Patent
Marshall

(10) Patent No.: US 9,027,495 B2
(45) Date of Patent: May 12, 2015

(54) BOAT PROTECTION DEVICE

(71) Applicant: John C. Marshall, Orange Beach, AL (US)

(72) Inventor: John C. Marshall, Orange Beach, AL (US)

( * ) Notice: Subject to any disclaimer, the term of this patent is extended or adjusted under 35 U.S.C. 154(b) by 147 days.

(21) Appl. No.: 13/654,844

(22) Filed: Oct. 18, 2012

(65) Prior Publication Data

US 2013/0276689 A1     Oct. 24, 2013

Related U.S. Application Data

(60) Provisional application No. 61/548,314, filed on Oct. 18, 2011.

(51) Int. Cl.
*B63B 59/02*     (2006.01)
*E02B 3/26*      (2006.01)
*F16G 11/14*     (2006.01)

(52) U.S. Cl.
CPC . *B63B 59/02* (2013.01); *E02B 3/26* (2013.01); *F16G 11/14* (2013.01)

(58) Field of Classification Search
CPC ..................................................... B63B 59/02
USPC ............ 114/219; 441/127; 405/212; D12/168
See application file for complete search history.

(56) References Cited

U.S. PATENT DOCUMENTS

| | | | |
|---|---|---|---|
| 1,928,330 A * | 9/1933 | De Witt | 604/401 |
| 2,028,060 A * | 1/1936 | Gilbert | 47/32.5 |
| 3,473,505 A | 10/1969 | Brown | |
| 3,645,575 A | 2/1972 | Slavney | |
| 4,109,603 A | 8/1978 | Guthmann | |
| 4,114,553 A | 9/1978 | Zidek | |
| 4,190,011 A | 2/1980 | Guthmann | |
| 4,641,999 A | 2/1987 | Korbuly | |
| 4,841,893 A | 6/1989 | Ellison | |
| 5,016,554 A | 5/1991 | Harris, Jr. et al. | |
| 5,398,940 A * | 3/1995 | Derst, III | 473/430 |
| D359,019 S | 6/1995 | Kimball | |
| 5,493,983 A | 2/1996 | Hurt | |
| 5,671,692 A | 9/1997 | Kimball | |
| 5,970,900 A | 10/1999 | Sheldon et al. | |
| D425,461 S | 5/2000 | Beyer-Olsen | |
| D430,083 S | 8/2000 | Spearin | |
| D487,238 S | 3/2004 | Beyer-Olsen | |
| 2008/0216735 A1 * | 9/2008 | Boyd | 114/361 |
| 2011/0132249 A1 | 6/2011 | Loisel, Jr. | |

* cited by examiner

*Primary Examiner* — Edwin Swinehart
(74) *Attorney, Agent, or Firm* — Berenato & White, LLC

(57) ABSTRACT

A boat protection device includes a boat fender having a cushion, a first attachment element and a second attachment element. The first attachment element has a first keyhole aperture. The first keyhole aperture has a first slot and a first passage contiguous with the first slot. The second attachment element has a second keyhole aperture. The second keyhole aperture has a second slot and a second passage contiguous with the second slot.

2 Claims, 9 Drawing Sheets

BOAT PROTECTION DEVICE

CROSS-REFERENCE TO RELATED APPLICATION AND CLAIM OF PRIORITY

This application claims the benefit of priority of provisional application 61/548,314 filed Oct. 18, 2011, the complete disclosure of which is incorporated herein by reference.

FIELD OF THE INVENTION

The invention relates to boat protection devices and methods of making and using the same.

BACKGROUND

Boat fenders provide a cushion between a boat hull and/or rail and surrounding objects such as a dock, pier, pylon, or another boat. Boat fenders are typically held in place using ropes. The position of boat fenders must often be adjusted due to the varying heights of different docks, as well as the height difference between a boat and a particular dock caused by changing tides. Obtaining the correct position of the boat fender requires frequent tying and untying of the rope to adjust the length of the line. This process can be difficult to accomplish quickly while the boat is approaching a dock. During an approach, the boat is simultaneously moving under its own power and being rocked by wind and waves. The height of the dock relative to the boat is often unknown and the fenders must be repositioned and secured quickly to prevent damage to the boat and the dock.

SUMMARY

In accordance with an aspect, a boat protection device includes a boat fender having a cushion, a first attachment element and a second attachment element. The first attachment element is attached to the cushion and includes a first keyhole aperture. The first keyhole aperture has a first passage and a first slot contiguous with the first passage. The first passage has a first width and the first slot has a second width smaller than the first width. The second attachment element is attached to the cushion and includes a second keyhole aperture. The second keyhole aperture has a second passage and a second slot contiguous with the second passage. The second passage has a third width and the second slot has a fourth width smaller than the third width.

In accordance with another aspect, a boat protection device includes a fender line, a cushion, a first attachment element, and a second attachment element. The fender line has a length extending between a first end and a second end and a stop positioned along the fender line. The stop has a stop width extending in a direction perpendicular to the length of the fender line. The first attachment element includes a first keyhole aperture having a first passage and a first slot contiguous with the first passage. The first slot has a first slot width smaller than the stop width to prevent passage of the stop through the first slot. The first passage has a first passage width larger than the stop width to permit passage of the stop through the first passage. The second attachment element includes a second keyhole aperture having a second passage and a second slot contiguous with the second passage. The second slot has a second slot width smaller than the stop width to prevent passage of the stop through the second slot. The second passage has a second passage width larger than the stop width to permit passage of the stops through the second passage.

In accordance with a further aspect is a method of positioning a boat protection device on a boat. A fender line having a plurality of stops positioned thereon is attached to a boat-protection device. The fender line is positioned on a support. A first end of the fender line is drawn through a passage of a first or second keyhole slot on the boat protection device. A portion of the fender line between two adjacent stops is selected and the selected portion of the fender line is moved from the passage to a respective slot.

Other embodiments, including apparatus, systems, methods, and the like which constitute part of the invention, will become more apparent upon reading the following detailed description of the exemplary embodiments and viewing the drawings. It is to be understood that both the foregoing general description and the following detailed description are exemplary and explanatory only and therefore not restrictive.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. In such drawings.

DETAILED DESCRIPTION OF EXEMPLARY EMBODIMENT(S) AND EXEMPLARY METHOD(S)

Figure 1:
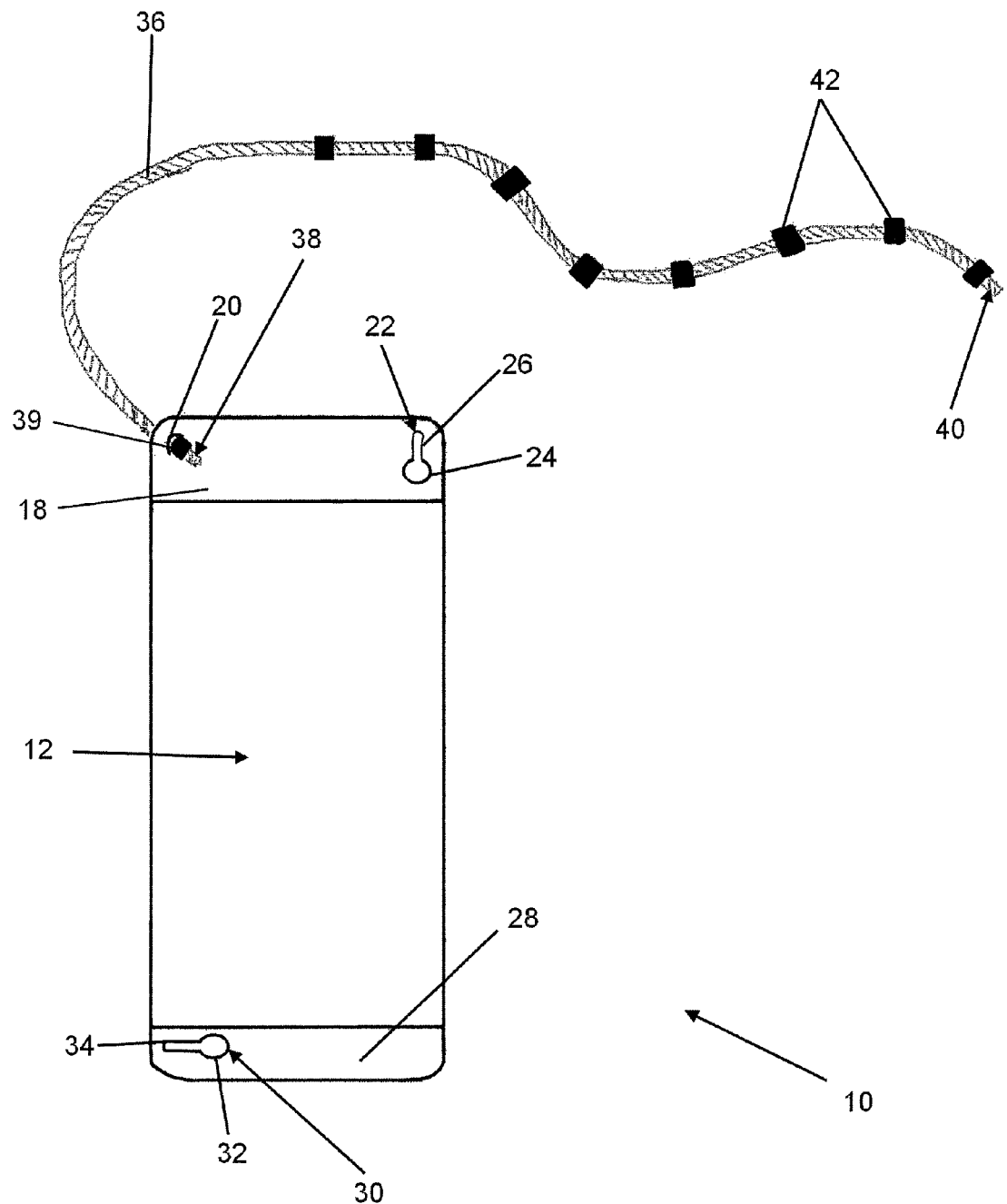
FIG. 1 is a front view of a boat protection device according to an embodiment of the invention.

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

FIG. 1 shows an exemplary boat protection device 10. The boat protection device 10 includes a cushion 12 which may come in various shapes, sizes and types and may be made from a variety of materials, including polymeric, foam, elastomeric materials, composites, and any combination thereof. The cushion 12 may have a shock-absorbing attribute. For example the cushion 12 may include a foam or elastomeric material which reduces impact. In another embodiment, the cushion 12 may have a hollow interior chamber permanently sealed or it may be inflatable using a tube or other inlet for inflating. The cushion 12 also may include various rings, ribs, or flutes. While the cushion 12 is shown generally elongated, it may possess other shapes.

Figure 2A:
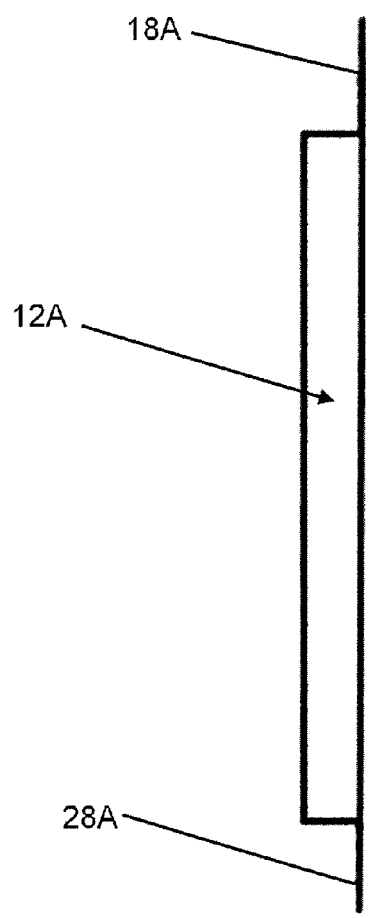
FIG. 2A is a side view of an exemplary boat protection device.
Figure 2B:
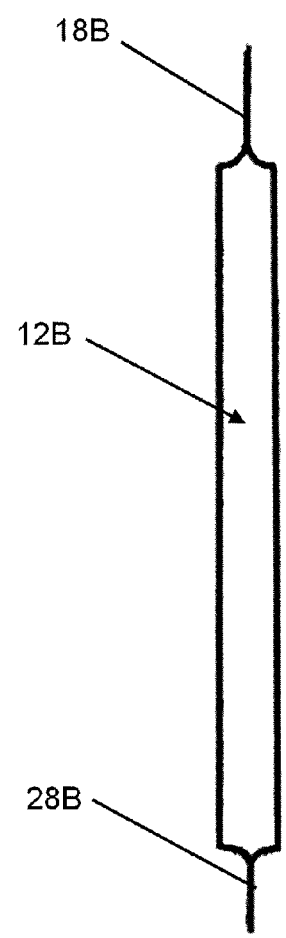
FIG. 2B is a side view of another embodiment of a boat protection device.

In the embodiment shown in FIG. 1, the cushion 12 has a first attachment element 18 and a second attachment element 28. The first and second attachment elements 18, 28 may be positioned at opposite ends of the cushion 12. The first and second attachment elements 18, 28 may also be positioned at different locations and at different orientations to each other on the cushion. As shown in FIGS. 2A and 2B, which as discussed below show variations of the cushion 12, the first and second attachment elements 18, 18A, 18B, 28, 28A, 28B may be thinner than the cushion 12, 12A, 12B. The first and second attachment elements 18, 28 may be integrally formed with the shock-absorbing central area of the fender body 12, or may be separately formed components that are fastened, joined, or otherwise attached to the shock-absorbing central area.

The first attachment element 18 contains an opening 20 and a first keyhole aperture 22. In an exemplary embodiment the opening 20 is a circular hole extending through the first attachment element 18. In various exemplary embodiments the first keyhole aperture 22 includes a passage 24, embodied in FIG. 1 as a circular opening, and a slot 26 contiguous with and extending from the passage 24. The slot 26 is shown having a truncated-obround shape defined by an approximate semi-circular edge having two linear edges extending from the opposite ends of the semi-circular edge. The passage 24 and slot 26, however, may be various shapes and sizes, including square or rectangular. In various exemplary embodiments, both the passage 24 and the slot 26 extend through the first attachment region 14, though various embodiments may utilize a blind passage 24 and slot 26.

The second attachment element 28 contains a second keyhole aperture 30. Similar to the first keyhole aperture 22, the second keyhole aperture 30 may have a passage 32 in the shape of a circular opening and a slot 34 extending from the passage 32. The slot 34 may have a shape similar or identical to the slot 26 of the first keyhole aperture 22. Although the opening 20 and the passages 24 and 32 are shown having generally circular shapes, it should be understood that each may possess other shapes, including, for example elliptical, polygonal, etc. Various sized openings 20 and keyhole apertures 22, 30 may also be utilized.

FIG. 2A shows a first variation in which the cushion 12A has opposite attachment elements 18A and 28A. As shown in FIG. 2A, the attachment elements 18A, 28A extend coplanar with a back surface of the cushion 12A. In the second variation shown in FIG. 2B, the cushion 12B has a thick shock-absorbing central area and the first and second attachment elements 18B, 28B are attached at approximately the midpoint of the thickness of the cushion 12B.

As best shown in FIG. 1, the boat protection device 10 further includes a fender line 36. In an exemplary embodiment the fender line 36 is a rope, though other types of lines such as cables, wires, chains, fabric, or other material may be used. The fender line 36 has a first end 38 and a second end 40. The fender line 36 may be permanently connected to the fender body 12, for example through stitches or an adhesive, or releasably secure thereto. In the exemplary embodiment of FIG. 1, the first end 38 of the fender line 36 extends through the opening 20. A terminal stop 39 that is larger than the opening 20 is secured, fitted, knotted, or otherwise attached in proximity to or at the first end 38 of the fender line 36.

One or more additional stops 42 may be connected to or formed integral with the fender line 36. The stops 42 are shown spaced apart from one another by substantially uniform distances along the length of the fender line 36. Additional or fewer stops 42 than shown may be employed, and the spacing is not necessarily uniform. The stops 42 may be cylindrical, elliptical, polygonal, or any other shape. The stops 42 may be made from various materials, for example a polymer, wood, elastomer, metal, etc. The stops 42 may be permanently connected to the fender line 36 in fixed positions along the length of the fender line 36. For example, the stops 42 may be molded or knotted in the fender line 36. Alternatively, one, two, three, or more of the stops 42 also may be releasably or slidably connected to the fender line 36, such as via a clamping mechanism (e.g., circular spring clamp, hose clamp, butterfly clamp), so as to permit the stops 42 to be repositioned along the length of the fender line 36. In various exemplary embodiments the stops 42 are knots formed in the fender line 36.

The stops 42 may include the terminal stop 39 for connecting the first end 38 of the fender line 36 to the cushion 12. For example, the terminal stop 39 may be attached at or near the first end 38 of the fender line 36 which has been threaded through the opening 20 in the first attachment element 18. The terminal stop 39 is larger than the opening 20 and therefore prevents the first end 38 of the fender line 36 from being pulled through the opening 20.

Figure 3:
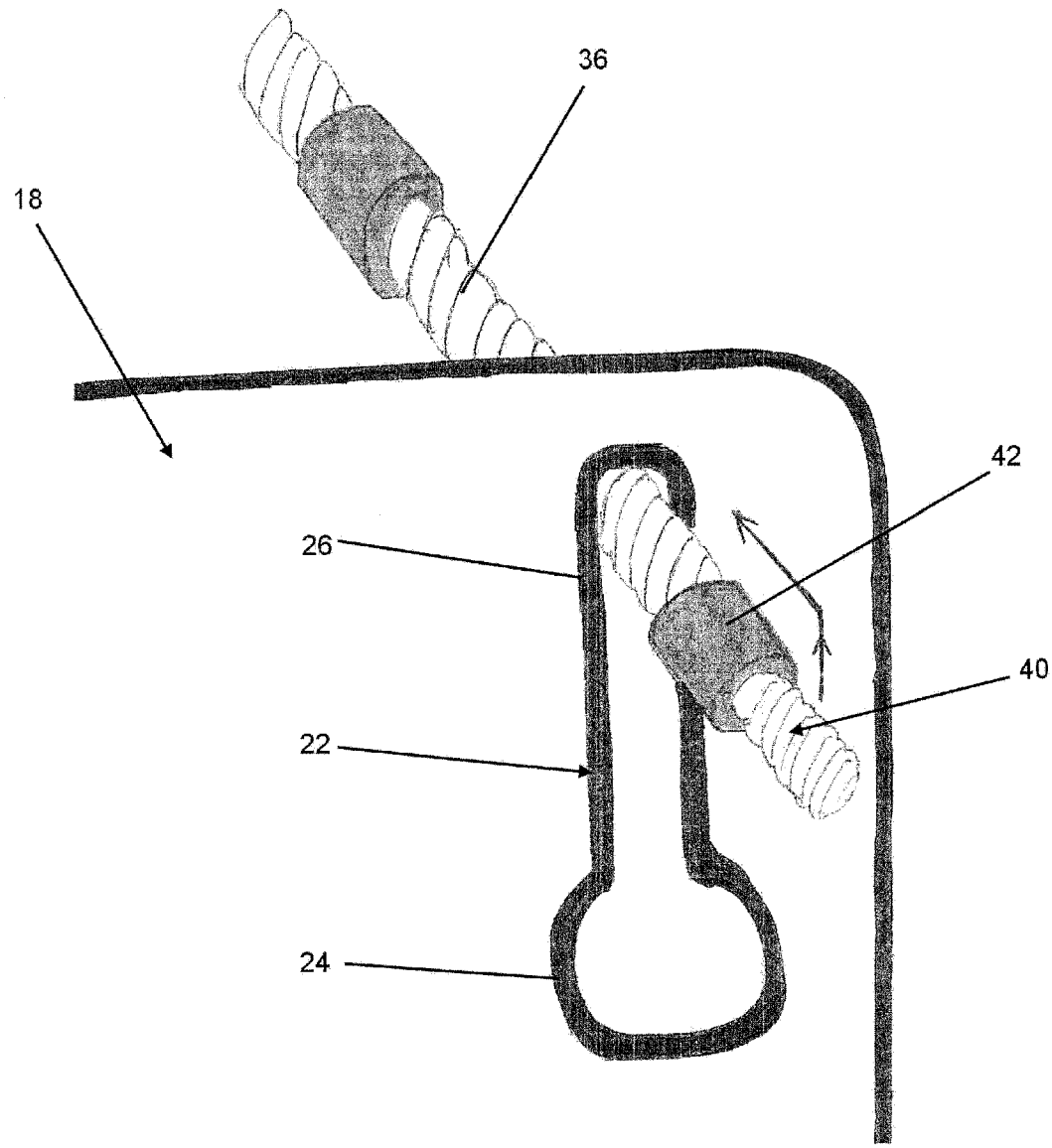
FIG. 3 is an enlarged, fragmented view of the exemplary boat protection device of FIG. 1.
Figure 4:
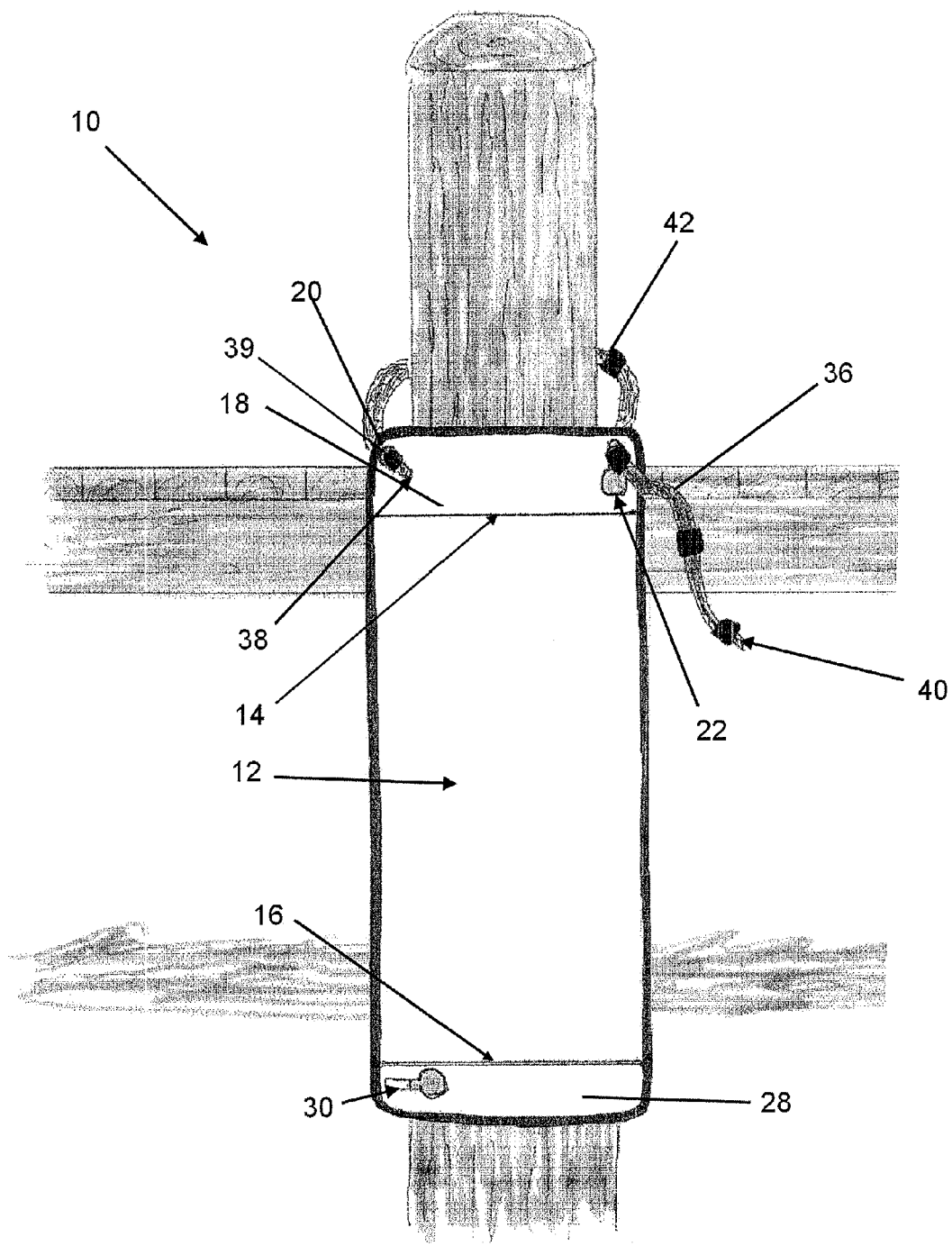
FIG. 4 is a front view of the exemplary boat protection device of FIG. 1 attached to a dock pile.

As best shown in FIG. 3, the stops 42 have a width extending in a direction perpendicular to the length of the fender line 36. The first and second slots 26, 34 have first and second slot widths, respectively, which are smaller than the stop width to prevent passage of the stops 42 through the first and second slots 26, 34. The first and second passages 24, 32 have first and second passage widths, respectively, which are larger than the stop width to permit passage of the stops 42 through the first and second passages 24, 32. In use, the fender line 36 may be releasably and adjustably secured to the attachment elements 18, 28 by passing the stops 42 through the first and second passages 24, 32 to a desired point. To selectively lock the fender line 36 in place relative to the cushion 12, the fender line 36 is moved in to the respective slot 26, 34 of the first or second attachment elements 18, 28. Although the stops 42 fit through the passages 24, 32, the stops cannot pass through the slots 26, 34. The second end 40, for example, may be threaded through the passages 24, 32 and, after the cushion 12 is appropriately mounted at the desired height or location, the fender line 36 is positioned in the respective slot 26, 34, which the stops 42 cannot pass through. The fender line 36 thereby secures the cushion 12 in place. A plurality of stops 42 may be provided at various positions along the fender line 36 so that the cushion 12 may be quickly and securely attached to a variety of objects and structures as shown in FIG. 4.

The plurality of stops 42 allows a user to adjust the free length of fender line 36. In various exemplary embodiments, the keyhole apertures 22, 30 are oriented approximately orthogonal to one another. As best shown in FIGS. 1 and 4, the first keyhole aperture 22 may be located in a corner of the first attachment element 18 and have a respectively vertical orientation. The second keyhole aperture 30 is located on the second attachment element 28, for example cater-corner to the first keyhole slot 22, and may have a respectively horizontal orientation. In various exemplary embodiment, the keyhole apertures 22, 30 may be located at any position along the respective attachment elements 18, 28.

Because of the placement of the keyhole apertures 22, 30, the boat protection device 10 may be attached to a structure in either a horizontal or vertical orientation. This makes the boat protection device 10 suitable for attaching to boat railings, boat posts, cleats, docks, pylons, and other structures. Moreover, the orientation of the keyhole apertures 22, 30 helps ensure that the boat fender body 12 stays securely attached, though various angles of keyhole slots 22, 30 may also be used.

Figure 5:
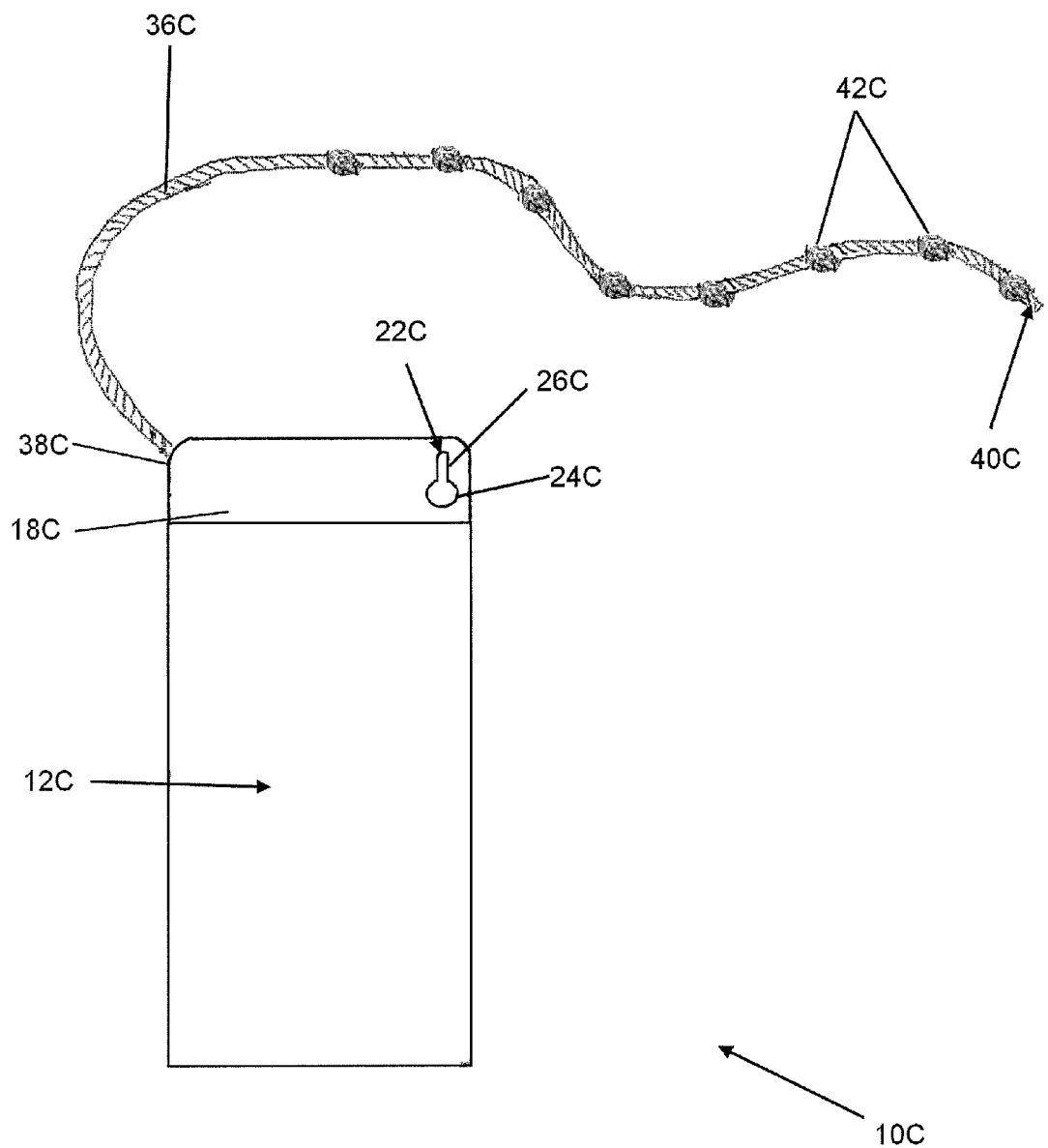
FIG. 5 is a front view of a boat protection device according to another embodiment of the invention.

FIG. 5 depicts another exemplary embodiment of the boat protection device 10C. The boat protection device 10C has a cushion 12C and a single attachment element 18C. The attachment element 18C contains a first keyhole aperture 22C. The first keyhole aperture 22C includes a passage 24C, embodied in FIG. 5 as a circular opening, and a slot 26C contiguous with and extending from the passage portion 24C. The slot 26C is shown having a truncated-obround shape defined by an approximate semi-circular edge having two linear edges extending from the opposite ends of the semi-circular edge. In various exemplary embodiments, both the passage 24C and the slot 26C extend through the first attachment element 18C.

The boat protection device 10C further includes a fender line 36C having a first end 38C and a second end 40C. The first end 38C of the fender line 36C is permanently fixed to the attachment element 18C, for example, by a stitched attachment. The fender line contains a plurality of stops 42C, depicted in FIG. 5 as knots formed in the fender line 36C. The knots 42C fit through the passage 24C and the fender line 36C may be drawn up into the slot portion 26C to secure the boat protection device 10C in place.

Figure 6:
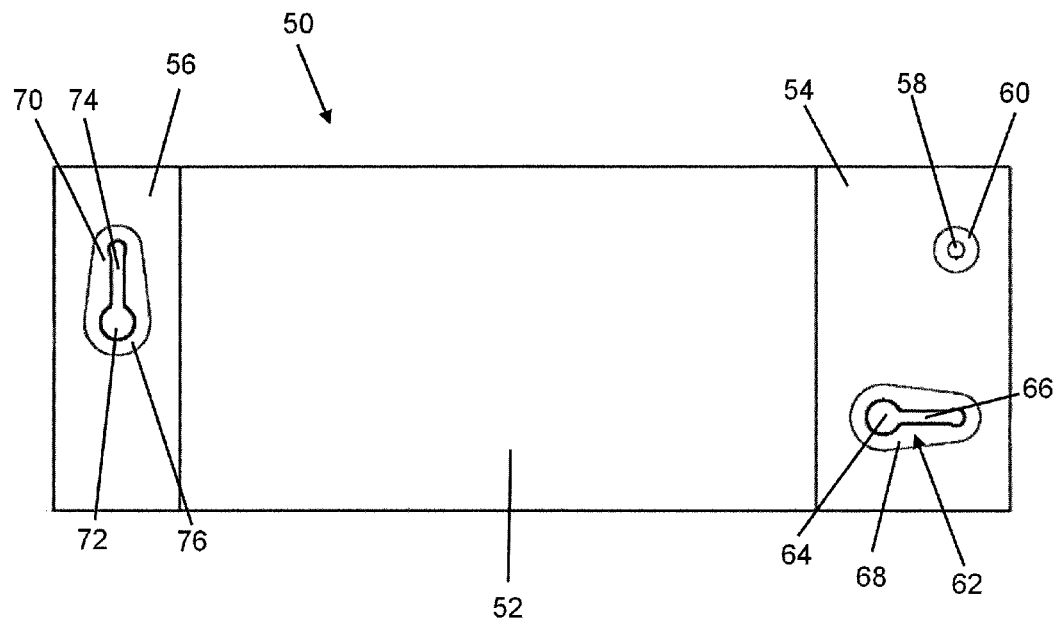
FIG. 6 is a front view of a boat protection device according to yet another embodiment of the invention.
Figure 7:
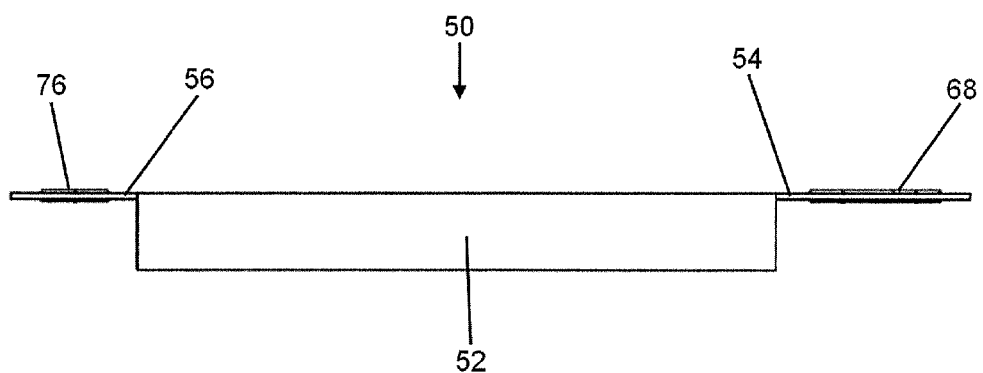
FIG. 7 is a side view of the boat protection device of FIG. 6.

FIGS. 6 and 7 depict another exemplary embodiment of a boat protection device 50. Similar to the boat protection device 10 depicted in FIG. 1, the boat protection device 50 depicted in FIGS. 6 and 7 includes a cushion 52, a first attachment element 54 and a second attachment element 56. The first and second attachment elements 54, 56 are positioned at opposite ends of the cushion 52. The first attachment element includes an opening 58. The opening extends through the first attachment element 56 and is surrounded by an opening grommet 60.

The first attachment element also includes a first keyhole aperture 62. The first keyhole aperture 62 extends through the first attachment element 54 and includes a passage 64 and a slot 66. The passage 64 is embodied in FIG. 6 as a circular opening. The slot 66 is contiguous with and extends from the passage 64. The slot 66 is shown having two linear edges extending from the passage 64 and terminating in a semi-circular opening. The passage 64 and slot 66, however, may be various shapes and sizes. The first keyhole passage 62 is surrounded by a first keyhole grommet 68.

The second attachment element also includes a second keyhole aperture 70. The second keyhole aperture 70 extends through the second attachment element 56 and includes a passage 72 and a slot 74. The passage 72 is embodied in FIG. 6 as a circular opening. The slot 74 is contiguous with and extends from the passage 72. The slot 74 is shown having two linear edges extending from the passage 72 and terminating in a semi-circular opening. The passage 72 and slot 74, however, may be various shapes and sizes. The second keyhole passage 70 is surrounded by a second keyhole grommet 76. As best shown in FIG. 7, the grommets 60, 68, 76 extend through the respective first and second attachment elements 54, 56. The grommets 60, 68, 76 may be formed from a variety of suitable materials, including metals, such as stainless steel, elastomers, such as rubber, and polymers, such as nylon. The grommets 60, 68, 76 may be a unitary structure which is attached to the respective attachment elements 54, 56, for example through an adhesive or by insert molding.

Figure 8:
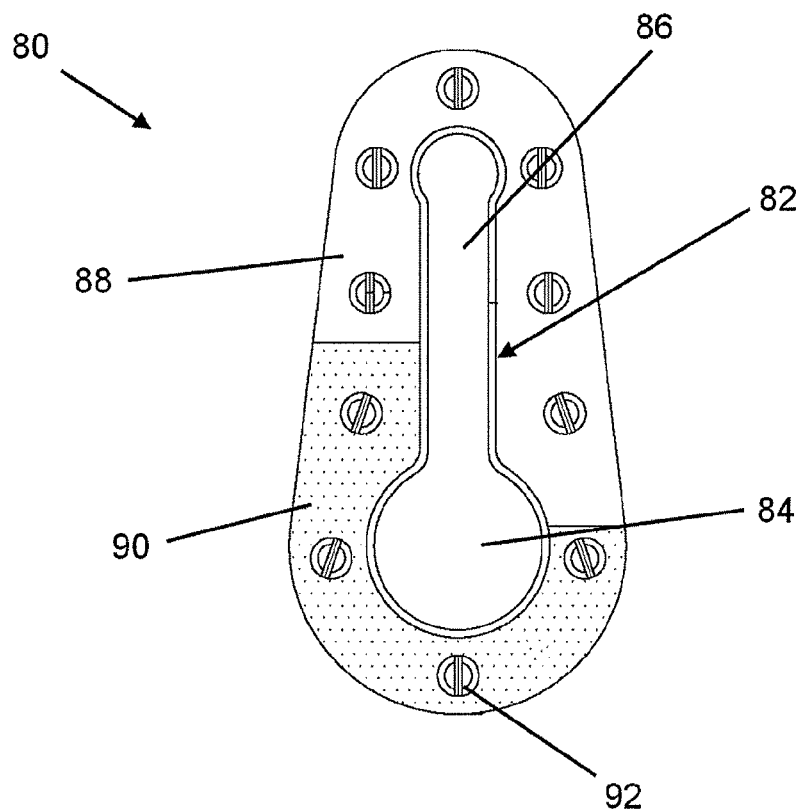
FIG. 8 is a front view of an exemplary grommet for use with the boat protection device.
Figure 9:
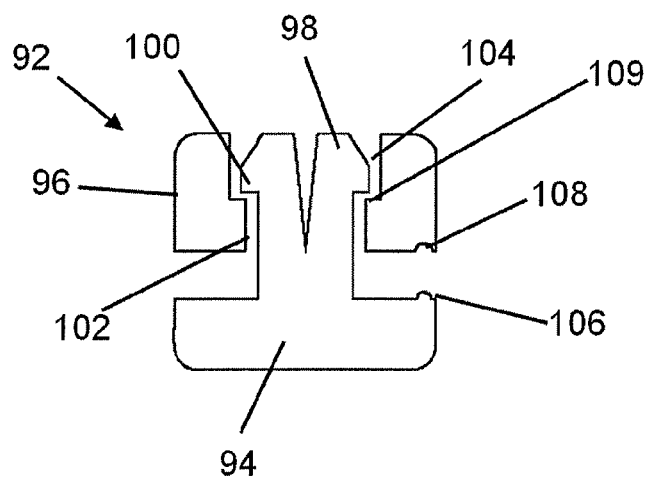
FIG. 9 is a side, sectional view of a fastener for use with the grommet shown in FIG. 8.

The grommets 60, 68, 76 also may be formed from a two-piece construction, having a top and bottom piece located on opposite sides of the attachment element 54 or 56 and connected to one another. FIGS. 8 and 9 depict an enlarged view of such an exemplary keyhole grommet 80. The keyhole grommet 80 includes a keyhole aperture 82 comprised of a passage 84 and a slot 86. The passage 84 is embodied in FIG. 8 as a circular opening. The slot 86 is contiguous with and extends from the passage 84. The slot 86 is shown having two linear edges extending from the passage 84 and terminating in a substantially semi-circular opening. The keyhole grommet 80 has a top plate 88 and a bottom plate 90. The top plate 88 and the bottom plate 90 are held in position by one or more fasteners 92. The fasteners 92 may be formed integrally with the top and bottom plates 88, 90, attached as separate elements, or a combination thereof.

As best shown in FIG. 9, the fasteners 92 include a male portion 94 and a female portion 96. The male portion 94 may include a split male end 98 having an annular notch 100. The female portion 96 has an opening 102 and a recess 104, with the recess 104 having a greater diameter than the opening 102. As the male portion 94 is inserted into the female portion 96, the split male end 98 is squeezed together as it passes through the opening 102. As the notch 100 fully enters the recess 104, the split male end 98 expands into the wider recess 104. The notch 100 of the expanded male end 98 is wider than an annular shoulder 109 of the female portion 96, such that the annular shoulder 109 impedes disengagement of the male and female portions 94, 96 from one another and forms a secure connection. The male portion 94 may also include a protrusion 106 which aligns and mates with a depression 108 in the female portion 96. The protrusion 106 and depression 108 may ensure proper alignment of the fastener 92. To disengage the female portion 96 from the male portion 94, the split male end 98 is squeezed inward upon itself, reducing its outer diameter to allowing the male end 98 to be slid by the annular should 109 and out through the opening 102.

Figure 10:
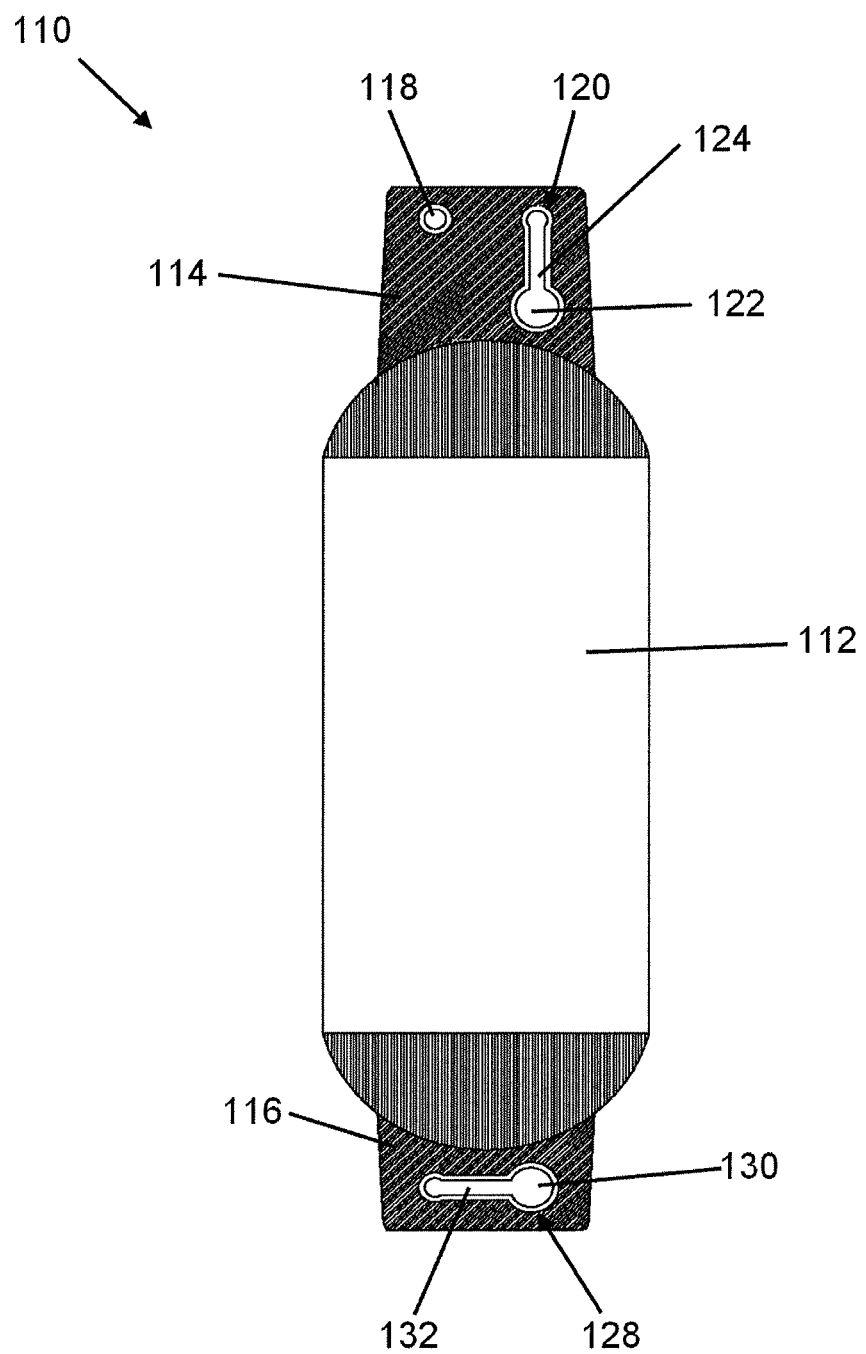
FIG. 10 is a front view of a boat protection device according to another embodiment of the invention.

FIG. 10 depicts another embodiment of a boat protection device 110. The boat protection device 110 includes a cushion 112, a first attachment element 114, and a second attachment element 116. The cushion 112 is an elongated cylinder with the first and second attachment elements 114, 116 located at opposite ends of the cylinder. The first and second attachment elements 114, 116 may be thinner than the shock-absorbing central area of the cushion 112. The first and second attachment elements 114, 116 may be integrally formed with the cushion 112, or may be separate components that are fastened, connected, or otherwise attached to the cushion 112.

The first attachment element 114 contains an opening 118 and a first keyhole aperture 120. In an exemplary embodiment the opening 118 is a circular hole extending through the first attachment element 114. In various exemplary embodiments the first keyhole aperture 120 includes a passage 122, such as a circular opening, and a slot 124 contiguous with and extending from the passage 122. The slot 124 may have two linear edges extending from the passage 122 and connecting to a semi-circle. Both the passage 122 and the slot 124 extend through the first attachment element 114.

The second attachment element 116 contains a second keyhole aperture 128. Similar to the first keyhole aperture 120, the second keyhole aperture 128 includes a passage 130, such as a circular opening, and a slot 132 contiguous with and extending from the passage 130. The slot 132 may have two linear edges extending from the passage 130 and connecting to a substantially semi-circle. Both the passage 130 and the slot 132 extend through the second attachment element 116. In various exemplary embodiments, the first and second keyhole apertures 120, 128 have different orientations with respect to one another. For example, the first and second keyhole apertures 120, 128 may be oriented orthogonal to one another. Various shapes may be utilized in forming the keyhole apertures 120, 128, for example circular, elliptical, polygonal, etc. Various sizes may also be utilized for the opening 118 and keyhole apertures 120, 128.

Figure 11:
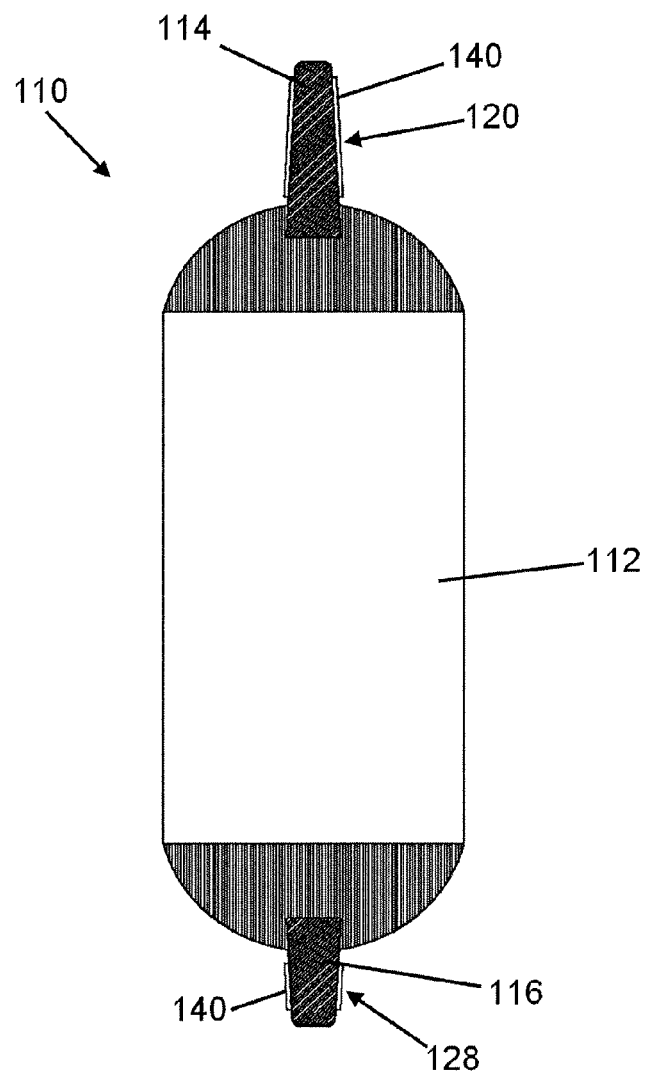
FIG. 11 is a side view of the boat protection device of FIG. 10.
Figure 12:
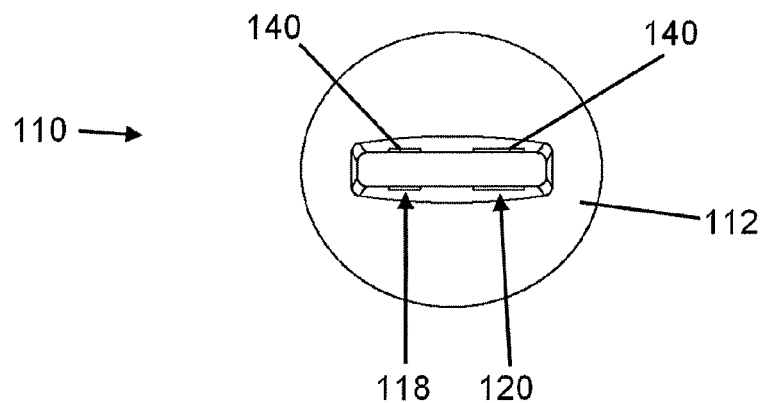
FIG. 12 is a top view of the boat protection device of FIG. 10.

As best shown in FIGS. 11 and 12, the opening 118 and keyhole apertures 120, 128 include reinforcement 140. The reinforcement 140 may be an eyelet, grommet, washer, or other type of reinforcement member. The reinforcement 140 also may be a thickened region of the material surrounding the opening 118 and keyhole apertures 120, 128.

The boat protection devices 10, 110 discussed herein may be used in a variety of ways. For example, with reference to the boat protection device 10, it may be stored on a boat and retrieved as the boat approaches a structure, such as a dock, pylon, or another boat. The boat protection device 10 may then be positioned on a support, for example an element on the boat or the structure. Depending on the location and height of the structure, the boat protection device 10 may be positioned on various rails, posts, cleats, etc. The fender line 36 is wrapped, looped, or otherwise positioned around or through the chosen boat element and the second end 40 of the fender line 36 is placed through the passage 24, 32 in the first or second keyhole aperture 22, 30. The user may select a keyhole aperture 22, 30 based on the desired position and orientation of the cushion 12. After the second end 40 of the fender line 36 is drawn through the passage 24, 32, the fender line 36 is drawn to a desired tightness and height. The fender line 36 is then inserted into the respective slot 26, 34. The fender line 36 is held in place by the closest stop 42, securing the boat protection device 10. Alternatively, the boat protection device 10 may be attached to the structure, e.g., a dock, in a similar manner as opposed to being attached to the boat.

As used herein, the term "boat" may encompass other types of water-traversing vehicles, such as a ship, vessel, yacht, liner, cruiser, ferry, kayak, jet-ski, etc.

The foregoing detailed description of the certain exemplary embodiments has been provided for the purpose of explaining the principles of the invention and its practical application, thereby enabling others skilled in the art to understand the invention for various embodiments and with various modifications as are suited to the particular use contemplated. This description is not necessarily intended to be exhaustive or to limit the invention to the precise embodiments disclosed. Additional embodiments are possible and are intended to be encompassed within this specification and the scope of the appended claims. The specification describes specific examples to accomplish a more general goal that may be accomplished in another way.

Only those claims which use the words "means for" are to be interpreted under 35 U.S.C. 112, sixth paragraph.

What is claimed:

1. A boat protection device, comprising:
   a fender line having a length extending between a first end and a second end;
   a stop positioned along the fender line, the stop having a stop width extending in a direction perpendicular to the length of the fender line;
   a cushion;
   a first attachment element comprising a first keyhole aperture having a first passage and a first slot contiguous with the first passage, the first slot having a first slot width smaller than the stop width to prevent passage of the stop through the first slot, the first passage having a first passage width larger than the stop width to permit passage of the stop through the first passage; and
   a second attachment element comprising a second keyhole aperture having a second passage and a second slot contiguous with the second passage, the second slot having a second slot width smaller than the stop width to prevent passage of the stop through the second slot, the second passage having a second passage width larger than the stop width to permit passage of the stops through the second passage;
   the first end of the fender line permanently attached to the first attachment element.

2. A method of positioning a boat-protection device on a boat, comprising:
   attaching a fender line comprising a plurality of stops positioned thereon to the boat-protection device, the boat-protection device comprising:
      a cushion;
      a first attachment element attached to the cushion, the first attachment element comprising a first keyhole aperture having a first passage and a first slot contiguous with the first passage, the first passage having a first width and the first slot having a second width smaller than the first width; and
      a second attachment element attached to the cushion, the second attachment element comprising a second keyhole aperture having a second passage and a second slot contiguous with the second passage, the second passage having a third width and the second slot having a fourth width smaller than the third width;
   positioning the fender line on a support;
   drawing a first end of the fender line through the passage of the first or second keyhole slot;
   selecting a portion of the fender line between two adjacent stops; and
   moving the selected portion of the fender line from the passage to the respective slot.

* * * * *